US012428965B2

(12) United States Patent
Patel et al.

(10) Patent No.: US 12,428,965 B2
(45) Date of Patent: Sep. 30, 2025

(54) LOAD BEARING FEATURE FOR CERAMIC MATRIX COMPOSITE TURBINE COMPONENTS

(71) Applicant: RTX Corporation, Farmington, CT (US)

(72) Inventors: Rutva A. Patel, Middletown, CT (US); James T. Roach, Vernon, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/428,856

(22) Filed: Jan. 31, 2024

(65) Prior Publication Data

US 2025/0243768 A1 Jul. 31, 2025

(51) Int. Cl.
*F01D 5/28* (2006.01)
*F02C 7/00* (2006.01)

(52) U.S. Cl.
CPC .............. *F01D 5/282* (2013.01); *F02C 7/00* (2013.01); *F05D 2230/20* (2013.01); *F05D 2300/6033* (2013.01)

(58) Field of Classification Search
CPC .......... F01D 5/147; F01D 5/282; F01D 5/284; F01D 9/042; F01D 5/18; F01D 5/225; F01D 9/041; F01D 11/008; F01D 9/02; F01D 9/04; F01D 5/26; F01D 5/30; F01D 5/32; F01D 5/3233; F01D 5/326; F05D 2300/6033; F05D 2240/80; F05D 2230/50; F05D 2240/12; F05D 2230/20; F02C 7/00

See application file for complete search history.

(56) References Cited

U.S. PATENT DOCUMENTS 3,619,077 A * 11/1971 Wile .......................... F01D 5/18
  415/13
5,789,061 A    8/1998 Campbell et al.
6,164,903 A * 12/2000 Kouris ...................... F01D 9/04
  415/138
6,884,030 B2 * 4/2005 Darkins, Jr. ............ F01D 9/042
  29/889.22
8,251,652 B2 * 8/2012 Campbell ............... F01D 5/284
  415/209.3

(Continued)

FOREIGN PATENT DOCUMENTS

CA      2935369 A1    1/2017
CN   106014494 B  *  8/2018  .......... F01D 25/005

(Continued)

OTHER PUBLICATIONS

European Search Report for EP Application No. 25155105.7 dated Jul. 1, 2025.

*Primary Examiner* — Craig Kim
(74) *Attorney, Agent, or Firm* — Carlson, Gaskey & Olds, P.C.

(57) ABSTRACT

A gas turbine engine component includes an inner surface and an outer surface. The outer surface and the inner surface are formed of ceramic matrix composite layers, and mount member. The mount member is in contact with an insert that is inserted within outer layers of the outer platform to form a thickened portion having an end surface that will react against forces from the mount member. A gas turbine engine and a method are also disclosed.

20 Claims, 6 Drawing Sheets

(56) References Cited

U.S. PATENT DOCUMENTS

| | | | | |
|---|---|---|---|---|
| 8,672,609 | B2* | 3/2014 | Lussier | F01D 25/243 |
| | | | | 415/197 |
| 8,734,605 | B2 | 5/2014 | Harrison | |
| 8,888,451 | B2* | 11/2014 | Falk | F01D 9/042 |
| | | | | 415/209.3 |
| 8,905,711 | B2* | 12/2014 | Suciu | F01D 5/282 |
| | | | | 415/193 |
| 9,005,382 | B2 | 4/2015 | Steibel et al. | |
| 9,664,053 | B2 | 5/2017 | Marshall et al. | |
| 9,752,445 | B2* | 9/2017 | Watanabe | F01D 5/282 |
| 10,329,950 | B2* | 6/2019 | Freeman | F01D 25/12 |
| 10,589,474 | B2 | 3/2020 | Tsai et al. | |
| 10,724,387 | B2* | 7/2020 | Farrar | F01D 5/282 |
| 10,737,449 | B2 | 8/2020 | Bernetich et al. | |
| 11,465,731 | B2 | 10/2022 | Douglas | |
| 11,519,280 | B1* | 12/2022 | Bainbridge | F01D 9/042 |
| 11,560,799 | B1* | 1/2023 | Harris | F01D 9/041 |
| 11,773,735 | B2* | 10/2023 | Whittle | F01D 5/284 |
| | | | | 415/200 |
| 11,773,751 | B1* | 10/2023 | Freeman | F01D 11/08 |
| | | | | 415/173.1 |
| 12,006,842 | B1 | 6/2024 | Kim | F01D 5/147 |
| 12,173,621 | B2* | 12/2024 | Dube | F01D 9/041 |
| 2005/0076504 | A1* | 4/2005 | Morrison | F01D 9/044 |
| | | | | 29/889.7 |
| 2007/0237630 | A1* | 10/2007 | Schiavo | F01D 11/008 |
| | | | | 415/179 |
| 2008/0203236 | A1* | 8/2008 | Mazzola | F01D 5/284 |
| | | | | 244/35 R |
| 2010/0054932 | A1* | 3/2010 | Schiavo | F01D 9/04 |
| | | | | 415/200 |
| 2013/0052030 | A1* | 2/2013 | McCaffrey | F01D 9/041 |
| | | | | 416/241 B |
| 2013/0180642 | A1 | 7/2013 | Blot et al. | |
| 2017/0298748 | A1* | 10/2017 | Vetters | F01D 25/246 |
| 2018/0051581 | A1* | 2/2018 | Quennehen | F01D 11/08 |
| 2018/0179906 | A1* | 6/2018 | Schetzel | F01D 9/041 |
| 2020/0362709 | A1* | 11/2020 | Whittle | F01D 5/284 |
| 2021/0140341 | A1* | 5/2021 | Generale | F01D 11/005 |
| 2023/0191746 | A1* | 6/2023 | Gimat | B32B 3/06 |
| | | | | 428/293.4 |
| 2023/0193527 | A1 | 6/2023 | Read | |
| 2024/0044258 | A1* | 2/2024 | Wasserman | F01D 5/147 |

FOREIGN PATENT DOCUMENTS

| | | | | |
|---|---|---|---|---|
| CN | 110529195 | B | 6/2022 | |
| EP | 4006307 | A2 | 6/2022 | |
| EP | 4283096 | A1 | 11/2023 | |
| EP | 4317648 | A1 * | 2/2024 | F01D 25/005 |
| EP | 3971391 | B1 * | 5/2024 | F01D 5/188 |
| WO | 2014/128418 | A1 | 8/2014 | |

* cited by examiner

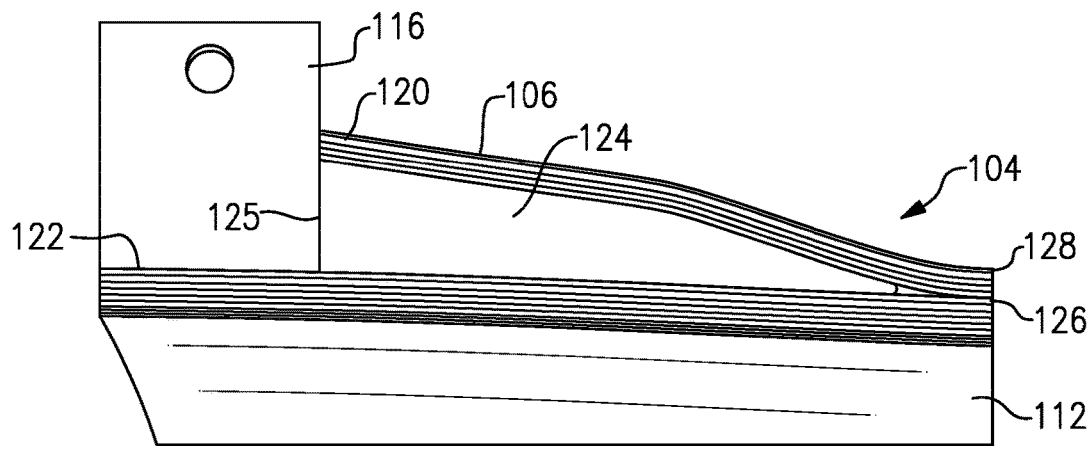
FIG.4A
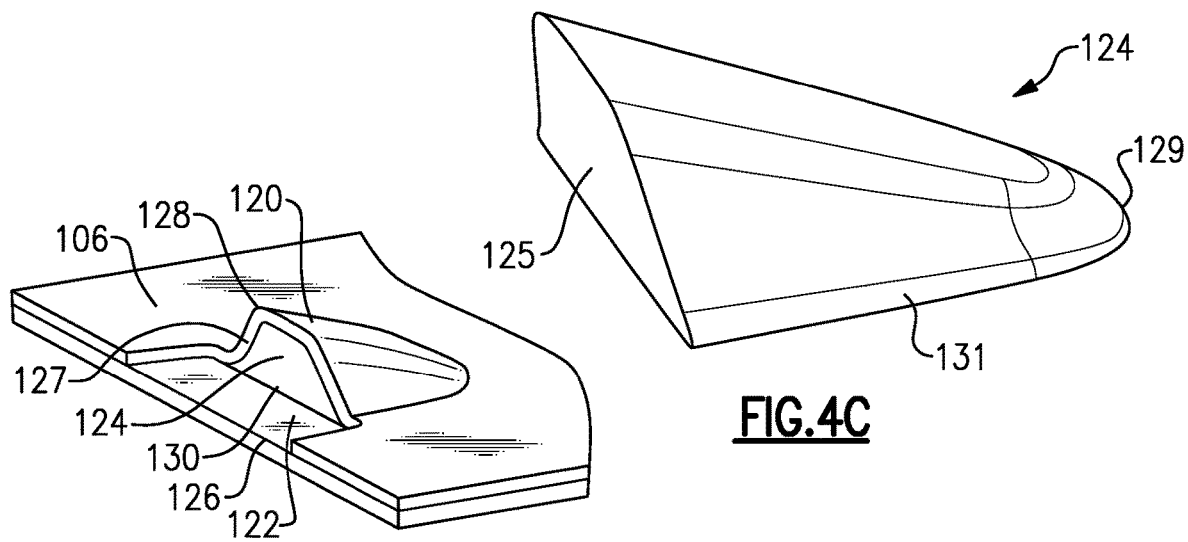
FIG.4B
FIG.4C
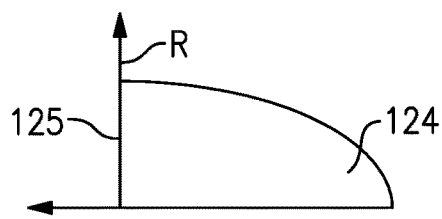
FIG.4D
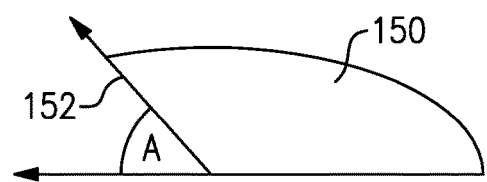
FIG.4E
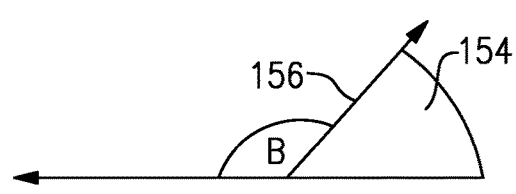
FIG.4F

LOAD BEARING FEATURE FOR CERAMIC MATRIX COMPOSITE TURBINE COMPONENTS

BACKGROUND OF THE INVENTION

This application relates to a turbine component formed of ceramic matrix composites ("CMCs") wherein a load bearing feature is placed on an upper platform.

Gas turbine engines are known, and typically include a propulsor delivering air into a compressor section where it is mixed with fuel and ignited. The propulsor also delivers air for propulsion outwardly of the compressor section. From the compressor the air is delivered into a combustor where it is mixed with fuel and ignited. Products of this combustion pass downstream over turbine rotors, driving them to rotate. The turbine rotors in turn drive the compressor rotor and the propulsor rotor.

It is known that the hot products of combustion raise challenges for components in the turbine section. Thus, it has been proposed to utilize CMCs to form the components, as that material is more resistant to temperature. However, the use of CMCs raises challenges.

SUMMARY OF THE INVENTION

In a featured embodiment, a gas turbine engine component includes an inner surface and an outer surface. The outer surface and the inner surface are formed of ceramic matrix composite layers, and mount member. The mount member is in contact with an insert that is inserted within outer layers of the outer platform to form a thickened portion having an end surface that will react against forces from the mount member.

In another embodiment according to the previous embodiment, the insert has an inner end remote from the end surface, and sides extend outwardly from the inner end such that the end surface is thicker in a radial direction and a lateral direction than at the inner end.

In another embodiment according to any of the previous embodiments, the outer surface is a radially outer platform, the inner surface is a radially inner platform and an airfoil connecting the radially inner platform to the radially outer platform.

In another embodiment according to any of the previous embodiments, the airfoil has a leading edge and a trailing edge, and the thickened portion is axially forward of the leading edge.

In another embodiment according to any of the previous embodiments, the outer platform has a pressure side edge and a suction side edge and the thickened portion is adjacent the suction side edge.

In another embodiment according to any of the previous embodiments, the insert is formed a plurality of layers of ceramic matrix composite layers.

In another embodiment according to any of the previous embodiments, the insert is formed as a monolithic structure.

In another embodiment according to any of the previous embodiments, the insert is a 3D woven insert.

In another featured embodiment, a gas turbine engine includes a compressor section, a combustor and a turbine section. The turbine section including rotating turbine blades and at least one stationary component mounted adjacent a rotating turbine blade. The stationary component having an inner surface and an outer surface. The outer surface and the inner surface are formed of ceramic matrix composite layers, and a mount member. The mount member is in contact with an insert that is inserted within outer layers of the outer surface to form a thickened portion having an end surface that will react against forces from the mount member.

In another embodiment according to any of the previous embodiments, the insert has with an inner end remote from the end surface, and sides extend outwardly from the inner end such that the end surface is thicker in a radial direction and a lateral direction than at the inner end.

In another embodiment according to any of the previous embodiments, the outer surface is a radially outer platform and the inner surface is a radially inner platform and an airfoil connecting the radially inner platform to the outer platform.

In another embodiment according to any of the previous embodiments, the airfoil has a leading edge and a trailing edge, and the thickened portion is axially forward of the leading edge.

In another embodiment according to any of the previous embodiments, the outer platform has a pressure side edge and a suction side edge and the thickened portion is adjacent the suction side edge.

In another embodiment according to any of the previous embodiments, the insert is formed of a plurality of layers of ceramic matrix composite layers.

In another embodiment according to any of the previous embodiments, the insert is formed as a monolithic structure.

In another embodiment according to any of the previous embodiments, the insert is a 3D woven insert.

In another featured embodiment, a method of forming a gas turbine engine component includes the steps of providing a base layer of a plurality of CMC plies, attaching a rigid insert onto the base layer, applying outer cover plies over the rigid insert and then densifying the base layers and the cover plies.

In another embodiment according to any of the previous embodiments, the rigid insert is formed of a plurality of CMC plies, and is densified prior to being added to the base layer.

In another embodiment according to any of the previous embodiments, the rigid insert is formed as a monolithic material.

In another embodiment according to any of the previous embodiments, the base layer forms a portion of an outer platform of a vane having an airfoil.

The present disclosure may include any one or more of the individual features disclosed above and/or below alone or in any combination thereof.

These and other features of the present invention can be best understood from the following specification and drawings, the following of which is a brief description.

BRIEF DESCRIPTION OF THE DRAWINGS

FIG. 4A is a cross-section through a portion of the FIG. 3 vane.
FIG. 4B is a top view of a side of the FIG. 3 vane.
FIG. 4C shows an insert.
FIG. 4D schematically shows a first option for a reaction endface.
FIG. 4E shows an alternative option for a reaction endface.
FIG. 4F shows yet another alternative reaction endface.

DETAILED DESCRIPTION

Figure 1:
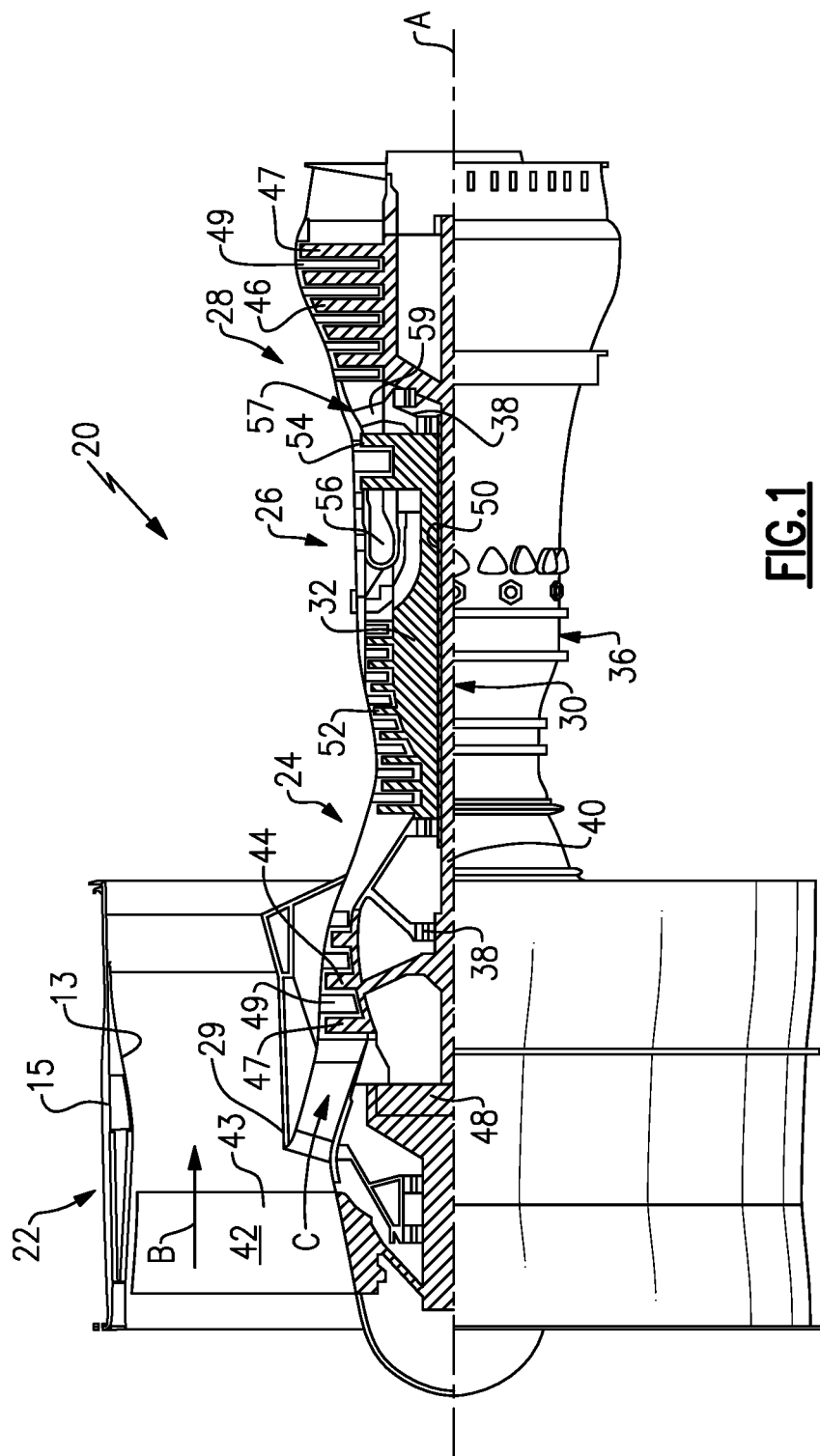
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. It should be understood that the teachings disclosed herein may be utilized with various engine architectures, such as low-bypass turbofan engines, prop fan and/or open rotor engines, turboprops, turbojets, etc. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(Tram\ °R)/(518.7\ °R)]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

Figure 2:
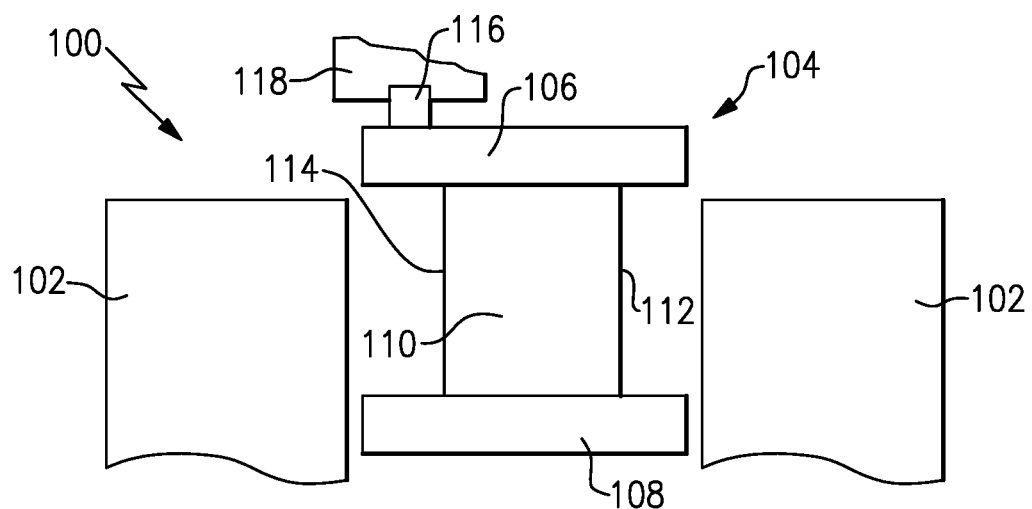
FIG. 2 schematically shows a turbine section.

FIG. 2 schematically shows a turbine section 100 which may be found in the engine of FIG. 1. As shown, rotating turbine blades 102 are separated by a static vane 104. Vane 104 has an outer platform 106 and an inner platform 108. An airfoil 110 connects platforms 106 and 108. Airfoil 110 has a leading edge 114 and a trailing edge 112.

A tab 116 is shown to position the vane 104 relative to static structure 118. The tab 116 applies force against a reaction or load bearing surface on vane 104.

Figure 3:
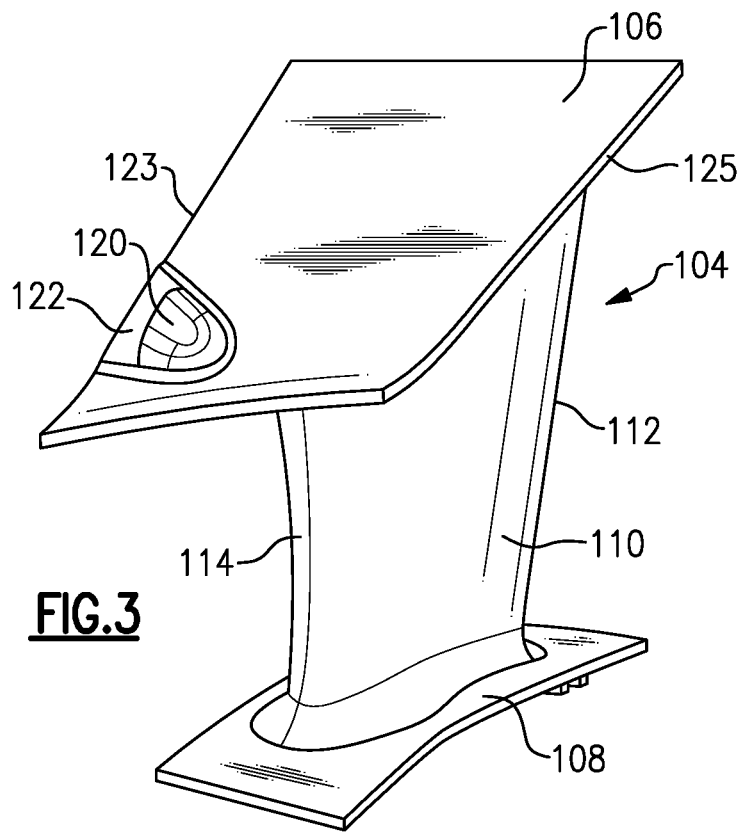
FIG. 3 shows a detail of a turbine vane as disclosed in this application.

FIG. 3 shows a vane 104 according to the teachings of this disclosure. On the outer platform 106 there is an increased thickness area that provides the load bearing surface 120. The increased thickness portion 120 is adjacent to a mount area 122 where the tab 116 will be mounted.

As shown, the thickened portion 120 and the mount area 122 are axially forward of the leading edge 114. Moreover, they are on a suction side edge 123 of the outer platform 106.

Vane 104 is formed of ceramic matrix composites. The increased thickness portion 120 could be at many other locations on the platforms 106 or 108 and at the pressure side edge 125.

A CMC material is comprised of one or more ceramic fiber plies in a ceramic matrix. The CMC material may also contain an interphase material between the fibers and the matrix. Example ceramic matrices are silicon-containing ceramic, such as but not limited to, a silicon carbide (SiC) matrix or a silicon nitride (Si3N4) matrix. Example ceramic reinforcement of the CMC are silicon-containing ceramic fibers, such as but not limited to, silicon carbide (SiC) fiber or silicon nitride (Si3N4) fibers. The CMC may be, but is not limited to, a SiC/SiC ceramic matrix composite in which SiC fiber plies are disposed within a SiC matrix. A fiber ply has a fiber architecture, which refers to an ordered arrangement of the fiber tows relative to one another, such as a 2D woven ply or a 3D structure. Examples of a 2D woven ply are plain weave, 5 Harness Satin Weave, 8 Harness Satin Weave and Twill. There are also braided architectures that may be used in a 2D sense, such as bi-axial or tri-axial braid. Examples of 3D weaves include, but are not limited to, layer to layer angle-interlock, orthogonal weave, polar weave. Of course, other techniques may be used. A monolithic ceramic does not contain fibers or reinforcement and is formed of a single material. Example monolithic ceramics include silicon-containing ceramics, such as silicon carbide (SiC) or silicon nitride (Si3N4).

As shown in FIG. 4A, there is a load bearing insert 124 inserted into the increased thickness portion 120. As shown, there are plies or layers 126 radially inward of the insert 124 and other layers 128 radially outward of the insert 124. An end face 125 of the insert 124 abuts the tab 116. During operation the tab 116 will transmit forces against the end face 125. The thickened portion 120, and in particular the insert 124, provides a good reaction force to resist the mechanical forces applied during operation.

FIG. 4B shows that the insert 124 is also formed of layers 127. Again, one can see the layers 128 and 126 radially outward and radially inward, respectively, the insert 124. Further, the mount 122 adjacent to the thicker portion 120 is shown.

FIG. 4C shows the insert 124 having a generally triangular shape with an outward angle from end 129 to reach end face 125. More accurately, it is an irregular quadrilateral with a blended edge.

The insert has a generally triangular shape with inner end 129 remote from the end surface 125. Sides 131 extending outwardly such that the end surface 125 is thicker in a radial direction and a lateral direction than the inner end 129. As shown, the shape actually tapers to edge 129. Of course other shapes can be used under this disclosure.

FIG. 4D shows one embodiment wherein the endface 125 is generally perpendicular to a radial direction R.

FIG. 4E shows an alternative insert 150 wherein the endface 152 is at an angle A which is less than 90 degrees.

FIG. 4F shows an alternative insert 154 wherein the endface 156 is at an angle B which is greater than 90 degrees. The orientation of the endface may be designed based upon desired properties.

Figure 5:
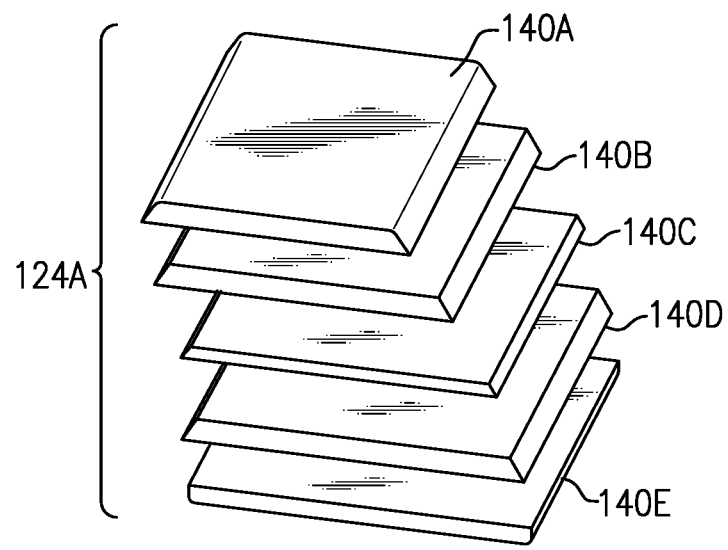
FIG. 5 shows a first assembly for forming an insert.

FIG. 5 shows a first embodiment 124A for forming the insert. As shown, a plurality of ply layers 140A, 140B, 140C, 140D and 140E are compressed together and may be formed of CMC layers. Once assembled, the insert 124A will be densified before being assembled into the vane.

Figure 6:
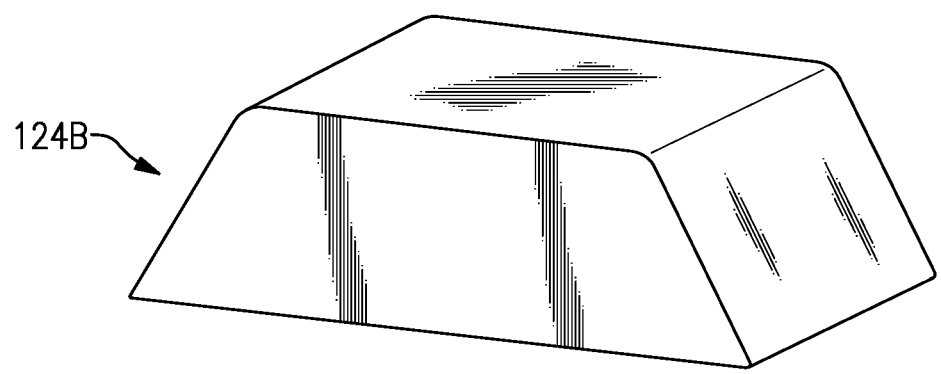
FIG. 6 shows an alternative insert embodiment.

FIG. 6 shows an alternative insert 124B wherein the insert is machined out of a monolithic material.

Figure 7:
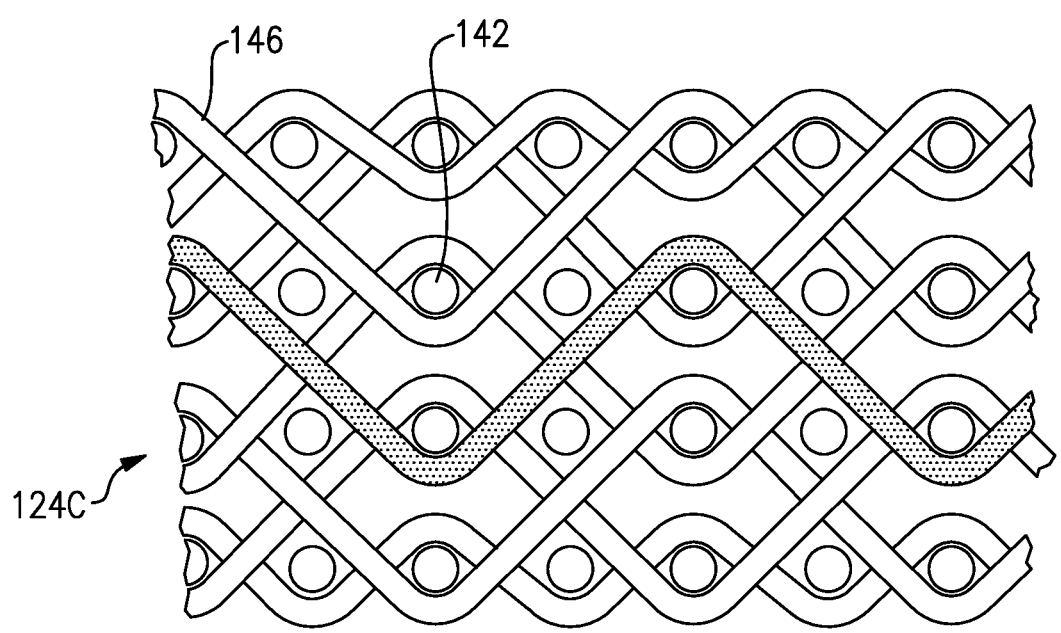
FIG. 7 is a cross-section of another embodiment.

FIG. 7 shows a 3D woven insert. As shown, angle interlock may be utilized to form the insert 124C. Angle interlock is a known technique for forming 3D woven structure.

As shown angle interlock the fibers 146 pass downwardly through plural fibers 142 and then outwardly again across plural fibers 142. Techniques may be utilized wherein the fibers 146 extend through greater numbers of fiber 142 than two. In addition, other 3D weaving processes may be utilized.

In embodiments, the inserts may be formed of a foam composites such as CMCs, or metal. The fibers may be utilized with 2D or 3D woven structures. Bi-axial or tri-axial braids may be utilized. Other materials may be considered.

Figure 8A:
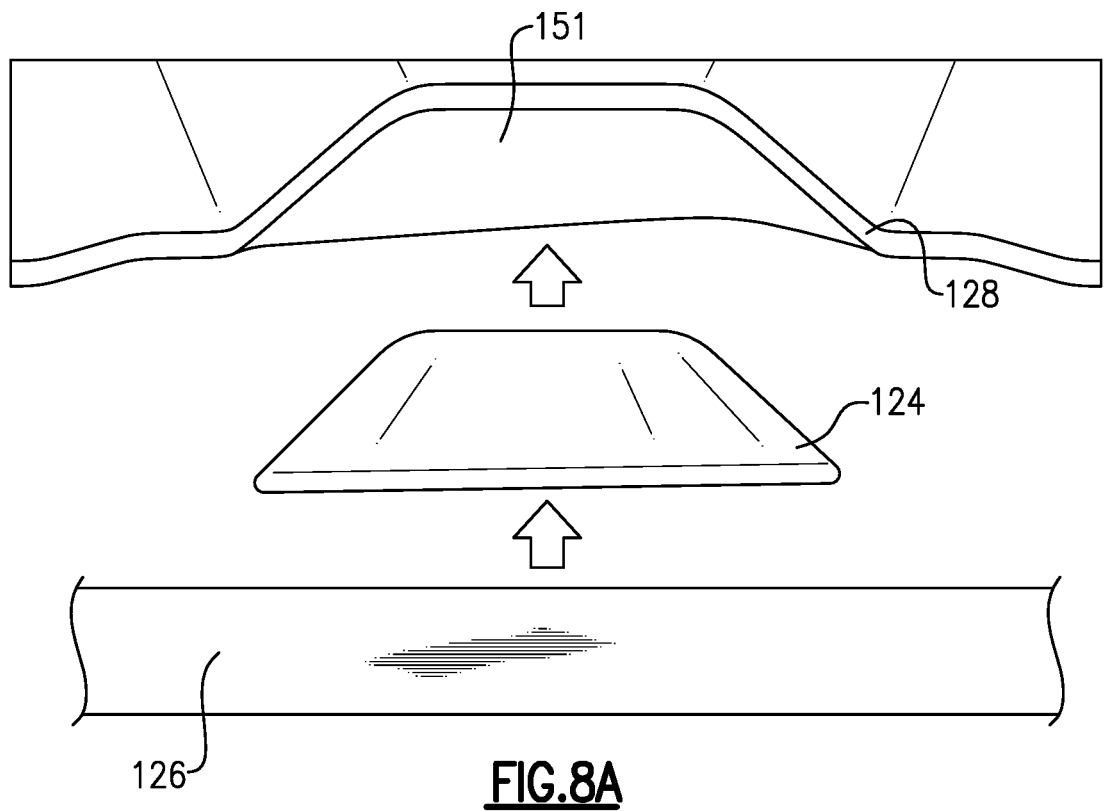
FIG. 8A shows how the insert is attached.

FIG. 8A shows a method for forming the thickened portion. As shown, there is a base layer 126 of CMC fabric plies. The insert 124 is placed on the base layer 126. Outer plies 128 are then placed over the insert. The outer plies 128 secure the insert, and have an end surface 151 that provides a stop for the insert. Once assembled, the layers 126 and 128, along with the rest of the component, are densified.

Figure 8B:
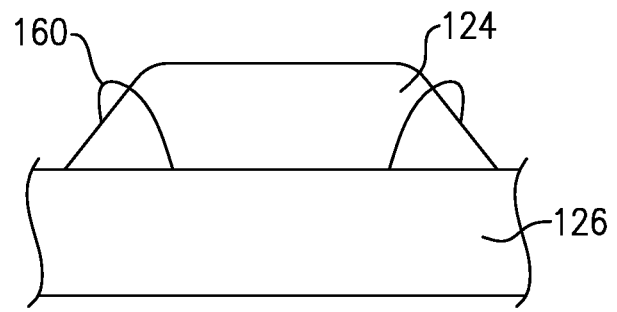
FIG. 8B shows another assembly option.

FIG. 8B schematically shows an alternative step wherein the insert 124 may be stitched at 160 to the base layer 126. Alternatively, the insert 124 could be stitched to the cover layer 128.

A gas turbine engine component under this disclosure could be said to include an inner surface and an outer surface. The outer surface and the inner surface are formed of ceramic matrix composite layers. The outer surface has a mount location and a mount member. The mount member is mounted on the mount location and in contact with a insert that is inserted within outer layers of the outer platform to form a thickened portion having an endface that will react against forces from the mount member.

Although embodiments of this disclosure have been disclosed, a worker of ordinary skill in this art would recognize that modifications would come within the scope of this disclosure. For that reason, the following claims should be studied to determine the true scope and content of this disclosure.

What is claimed is:

1. A gas turbine engine component comprising:
an inner surface and an outer surface, with the outer surface and the inner surface being formed of ceramic matrix composite layers, and a mount member, the mount member being in contact with an insert inserted within outer ones of the ceramic matrix composite layers of the outer surface to form a thickened portion having an end surface that will react against forces from the mount member.

2. The gas turbine engine component as set forth in claim 1, wherein the insert has an inner end remote from the end surface, and sides extending outwardly from the inner end such that the end surface is thicker in a radial direction and a lateral direction than at the inner end.

3. The gas turbine engine component as set forth in claim 1, wherein the outer surface is a radially outer platform, the inner surface is a radially inner platform and an airfoil connecting the radially inner platform to the radially outer platform.

4. The gas turbine engine component as set forth in claim 3, wherein the airfoil has a leading edge and a trailing edge, and the thickened portion is axially forward of the leading edge.

5. The gas turbine engine component as set forth in claim 4, wherein the outer platform has a pressure side edge and a suction side edge and the thickened portion is adjacent the suction side edge.

6. The gas turbine engine component as set forth in claim 1, wherein the insert is formed a plurality of layers of ceramic matrix composite layers.

7. The gas turbine engine component as set forth in claim 1, wherein the insert is formed as a monolithic structure.

8. The gas turbine engine component as set forth in claim 1, wherein the insert is a 3D woven insert.

9. A gas turbine engine comprising:
a compressor section, a combustor and a turbine section, the turbine section including rotating turbine blades and at least one stationary component mounted adjacent a rotating turbine blade; and
the stationary component having an inner surface and an outer surface, the outer surface and the inner surface being formed of ceramic matrix composite layers, and a mount member, the mount member being in contact with an insert inserted within outer one of the ceramic matrix composite layers of the outer surface to form a thickened portion having an end surface that will react against forces from the mount member.

10. The gas turbine engine as set forth in claim 9, wherein the insert has with an inner end remote from the end surface, and sides extending outwardly from the inner end such that the end surface is thicker in a radial direction and a lateral direction than at the inner end.

11. The gas turbine engine as set forth in claim 9, wherein the outer surface is a radially outer platform and the inner surface is a radially inner platform and an airfoil connecting the radially inner platform to the outer platform.

12. The gas turbine engine as set forth in claim 11, wherein the airfoil has a leading edge and a trailing edge, and the thickened portion is axially forward of the leading edge.

13. The gas turbine engine as set forth in claim 12, wherein the outer platform has a pressure side edge and a suction side edge and the thickened portion is adjacent the suction side edge.

14. The gas turbine engine as set forth in claim 9, wherein the insert is formed of a plurality of layers of ceramic matrix composite layers.

15. The gas turbine engine as set forth in claim 9, wherein the insert is formed as a monolithic structure.

16. The gas turbine engine as set forth in claim 9, wherein the insert is a 3D woven insert.

17. A method of forming a gas turbine engine component comprising the steps of:
providing a base layer of a plurality of CMC plies;
attaching a rigid insert onto the base layer, the rigid insert has an inner end remote from an end surface, with sides extending outwardly from the inner end such that the insert surface is thicker in a radial direction and a lateral direction than at the inner end;
applying outer cover plies over the rigid insert, but not covering the end surface such that the end surface may contact a mount member when the gas turbine engine component is mounted within a gas turbine engine; and
then densifying the base layers and the cover plies.

18. The method as set forth in claim 17, wherein the rigid insert is formed of a plurality of CMC plies, and is densified prior to being added to the base layer.

19. The method as set forth in claim 17, wherein the rigid insert is formed as a monolithic material.

20. The method as set forth in claim 17, wherein the base layer forms a portion of an outer platform of a vane having an airfoil.

* * * * *